United States Patent
Bignell

[11] Patent Number: 5,987,784
[45] Date of Patent: Nov. 23, 1999

[54] ATHLETIC SHOE WITH CLEAT RECEPTACLES

[75] Inventor: Tony A. Bignell, Portland, Oreg.

[73] Assignee: Nike International Ltd., Beaverton, Oreg.

[21] Appl. No.: 09/122,839

[22] Filed: Jul. 27, 1998

[51] Int. Cl.[6] ........................................................ A43B 5/00
[52] U.S. Cl. ................................ 36/134; 36/127; 36/67 A
[58] Field of Search .................................. 36/67 A, 67 R, 36/67 C, 67 D, 134, 59 B, 59 R, 127

[56] References Cited

U.S. PATENT DOCUMENTS

| | | | |
|---|---|---|---|
| 2,506,801 | 5/1950 | MacNeill | 36/59 |
| 4,361,971 | 12/1982 | Bowerman | 36/129 |

OTHER PUBLICATIONS

Nike Catalog, Track and Field, Spring, 1997, p. 13.

*Primary Examiner*—Paul T. Sewell
*Assistant Examiner*—J. Mohandesi
*Attorney, Agent, or Firm*—Banner & Witcoff, Ltd.

[57] ABSTRACT

There is disclosed a cleat or spike receptacle for an athletic shoe, particularly for a track shoe. The cleat receptacle comprises a cylinder, an integral annular plate, and ribs which extend upward from the annular plate and define openings through which the plastic spike plate material flows during formation of the outsole spike plate. The annular plate has a plurality of slots through which the plastic material also flows during the spike plate formation. The holes and slots of the three-dimensional shape cleat receptacle, through which the plastic spike plate material flows, provide an additional bond of the cleat receptacle to the outsole spike plate. In addition, more plastic spike plate material is below the annular plate of the cleat receptacle resulting in greater holding strength for the attached spikes. Either a detachable cleat, or an integrally formed cleat, is carried by the cylinder of the cleat receptacle.

29 Claims, 4 Drawing Sheets

ATHLETIC SHOE WITH CLEAT RECEPTACLES

BACKGROUND OF THE INVENTION

1. Field of Invention

The present invention relates in general to shoe soles for athletic shoes. More specifically, but without restriction to the particular use which is shown and described, this invention relates to an athletic shoe sole having permanent or detachable traction members, such as, cleats or spikes which improve the performance of the athletic shoe on natural and manmade surfaces.

2. Description of the Related Art

Depending on the sport, a variety of traction members, such as, cleats or spikes are used in different orientations in order to improve the traction of the athletic shoe. The cleats or spikes can be integrally formed with the sole of the shoe, or, alternatively, the cleats can be replaceable. Replaceable cleats generally have a threaded screw attachment that engages with a mating threaded cleat receptacle which is embedded within the spike plate of the shoe outsole during formation of the spike plate. Conventional cleat receptacles consist of an internally threaded cylinder having an integral annular plate circumscribing the exterior of the cylinder. During the formation of the spike plate, plastic material, such as, nylon or other suitable synthetic material, flows around the plurality of cleat receptacles positioned on the spike plate. Upon hardening, the cleat receptacles are held in place by the hardened plastic of the spike plate and the annular plate on the cleat receptacles. The annular plate serves as an anchor and prevents the cleat receptacle from being pulled out of the spike plate.

For example, U.S. Pat. No. 4,361,971 to Bowerman discloses a conventional cleat receptacle, having an annular plate, embedded in the spike plate. The annular plate is a flat circular ring that extends perpendicular to the cylinder portion of the receptacle. However, with a flat circular ring, during use of the athletic shoe, there is a tendency for bending of the annular plate which reduces the integrity of the receptacle plate in the outsole. In addition, with the conventional cleat receptacle, the cylinder portion of the receptacle focuses pin pressure on the foot during use instead of dissipating it within the spike plate.

U.S. Pat. No. 2,506,801 to MacNeill shows a shoe sole with detachable spikes. The detachable spikes are inserted into a spike receptacle. The spike receptacle consists of a threaded cylinder and an integral flat annular flange. The flat annular flange is integral with the threaded cylinder and holds the threaded cylinder within the molded shoe outsole. Again, with this flat annular flange, there is a tendency for bending of the flange during use of the shoe.

SUMMARY OF THE INVENTION

The present invention overcomes the disadvantages of the prior art by providing a three-dimensional cleat receptacle for an athletic shoe. The cleat receptacle comprises a threaded cylinder, an integral annular plate, and ribs which extend upward from the periphery of the annular plate to reinforce the annular plate to the body of the threaded cylinder. Each rib extends upward from the outer periphery of the annular plate and defines a hole through which the plastic outsole spike plate material flows during formation of the outsole spike plate. The annular plate has a plurality of slots or openings through which the plastic material also flows during the spike plate formation. The holes and slots of the three-dimensional shape cleat receptacle, through which the plastic spike plate material flows, provide an additional bond of the cleat receptacle to the outsole spike plate. The present invention also allows for more plastic spike plate material below the annular plate of the cleat receptacle resulting in greater holding strength for the attached spikes. In addition, the positioning of the annular plate near the inboard end of the threaded cylinder aids in decreasing the pin pressure placed on the foot when the attached cleats contact the ground.

Briefly, the present invention provides for a cleat receptacle for an athletic shoe outsole that comprises a threaded cylinder, an annular, slotted plate formed integral with the threaded cylinder and extending outward from the cylinder, and a plurality of ribs extending from the periphery of the annular plate to the outer wall of the threaded cylinder. The ribs define openings which are formed by the annular plate, the threaded cylinder wall and the ribs. During molding of the spike plate of the athletic shoe, plastic spike plate material flows around the cleat receptacle and through the slots and openings. Upon hardening of the spike plate, the hardened plastic material within the slots and openings provide for enhanced holding strength of the cleat receptacle to the spike plate. In addition, the ribs provide for greater structural integrity of the cleat receptacle to prevent bending of the annular plate during use of the athletic shoe. Further, the location of the annular plate along the threaded cylinder of the cleat receptacle aids in dissipating pin pressure within the spike plate.

BRIEF DESCRIPTION OF THE DRAWINGS

The preferred embodiment of the invention will be described in relation to the accompanying drawings. In the drawings, the following figures have the following general nature.

DESCRIPTION OF THE PREFERRED EMBODIMENTS

Figure 1:
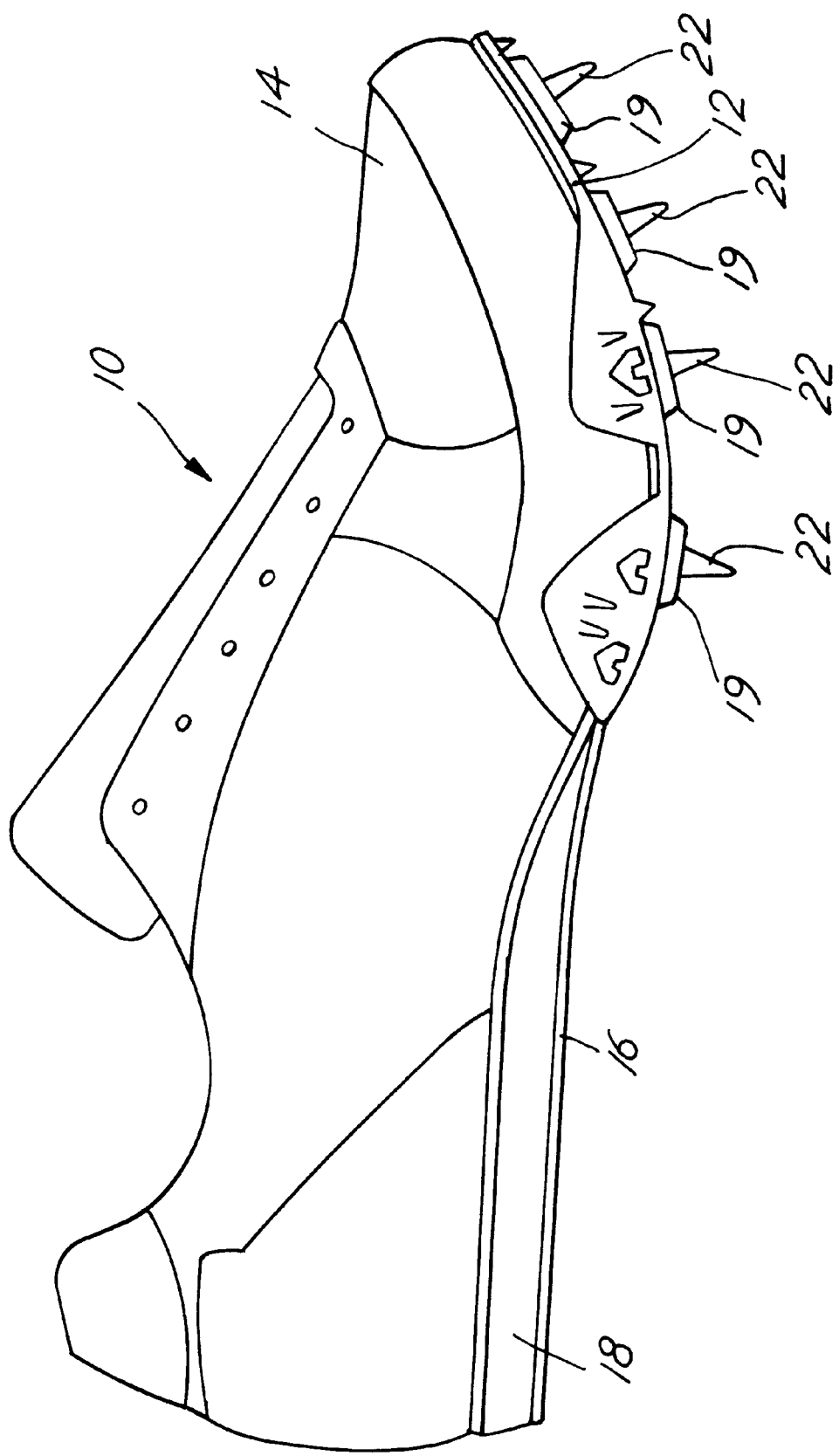
FIG. 1 is an elevation view of an athletic shoe according to the present invention.

Referring to the drawings wherein like numerals indicate like elements, there is shown in FIG. 1 an athletic shoe 10 made in accordance with the present invention. The athletic shoe of the present invention is very useful for a variety of sports, including track, where cleat traction is crucial. The athletic shoe 10 includes a spike plate 12, generally made of a nylon other suitable synthetic plastic material, secured to the bottom of a shoe upper 14 in any suitable manner such as by adhesive bonding. A partial outer sole 16 of hard rubber is also secured to the bottom of the shoe upper 14 beneath the heel portion of the shoe and extending along the shoe bottom to the spike plate 12. The partial outer sole 16 covers a soft sole layer 18 of elastomer material which cushions the heel.

Figure 2:
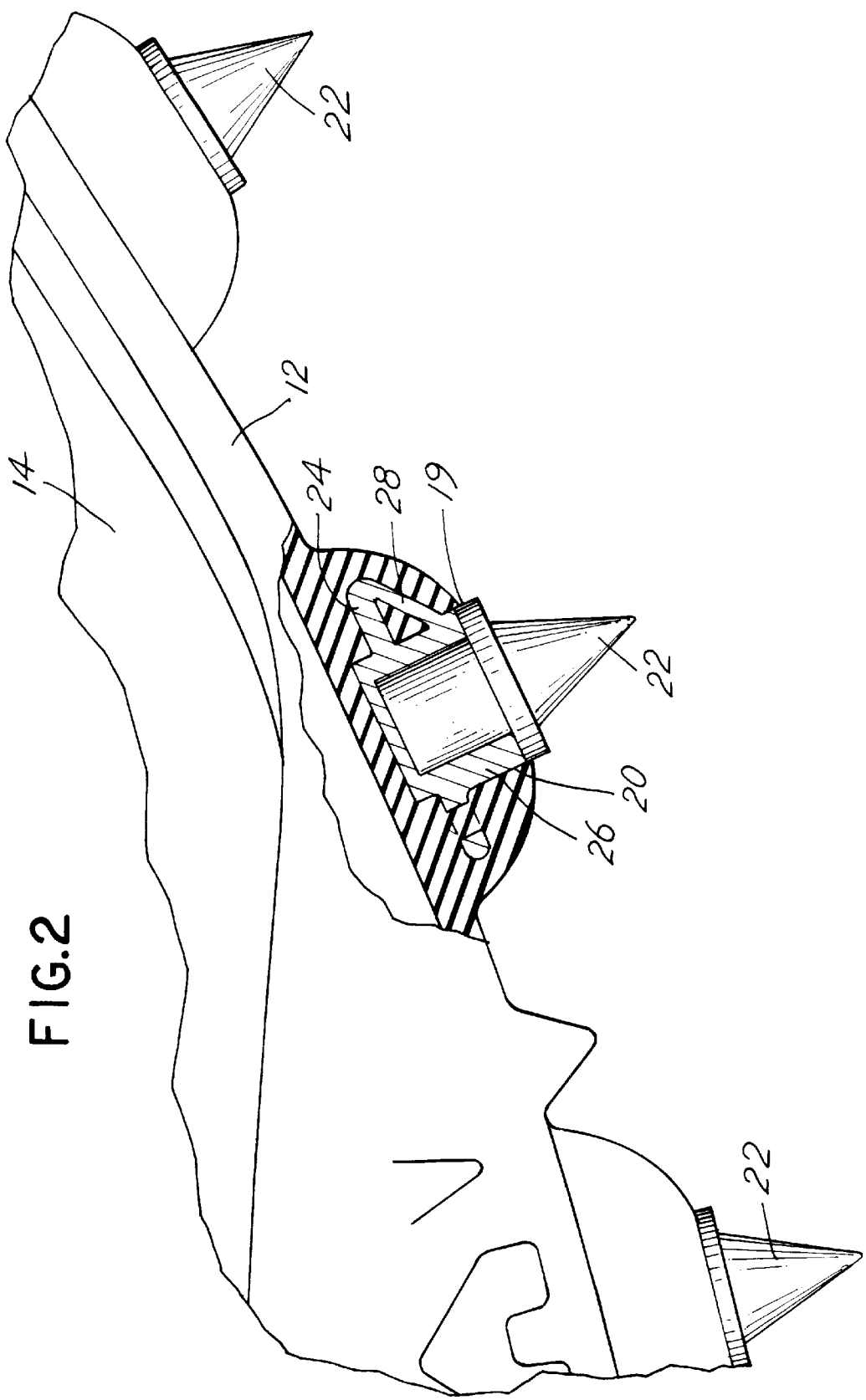
FIG. 2 is an exploded view of the embedded cleat receptacle of the invention of FIG. 1.

Referring to FIG. 2, there is shown the spike plate 12 which forms a plurality of raised traction surfaces 19 in which an embedded cleat or spike receptacle 20, in accordance with the present invention, is located. The receptacle 20 has an open threaded end 32 that is generally flush with the raised traction surfaces 19 of the spike plate. The receptacle 20 receives and engages threaded detachable spikes or cleats 22 which provide ground engaging traction for the athletic shoe 10. Alternatively, the receptacle 20 and cleat 22 may be an integral traction element that is embedded within the spike plate 12.

Figure 3:
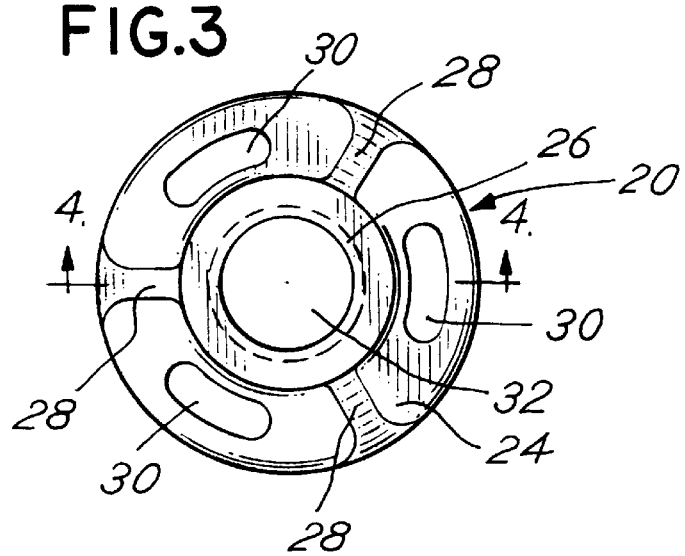
FIG. 3 is a top plan view of the cleat receptacle shown in FIG. 2.
Figure 4:
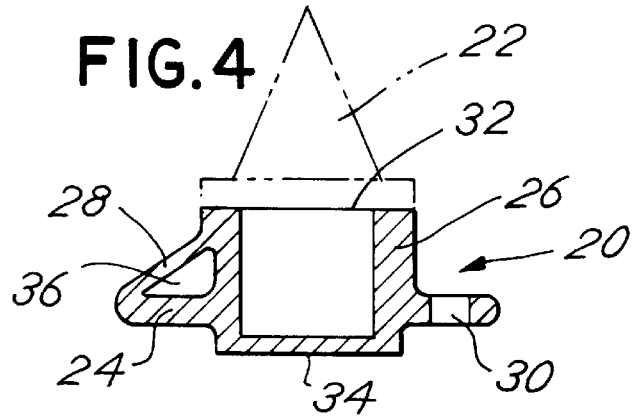
FIG. 4 is a cross-sectional elevation view of the cleat receptacle shown in FIG. 2.
Figure 5:
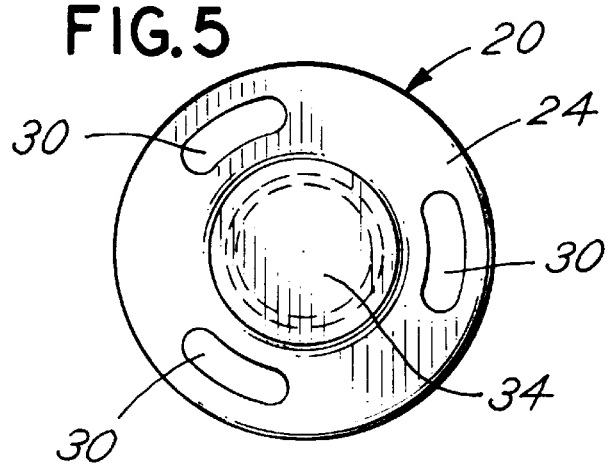
FIG. 5 is a bottom plan view of the cleat receptacle shown in FIG. 2.

Referring to FIGS. 3–5, the preferred embodiment of the cleat receptacle 20 of the present invention is shown. The cleat receptacle 20 comprises an annular flange or plate 24, a threaded cylinder 26, and a plurality of ribs 28. The receptacle 20 is typically forged from an aluminum composite but may be made from other suitable lightweight metal.

The annular plate 24 of the cleat receptacle 20 has a preferred circular shape and defines a smooth, rounded periphery. The annular plate serves as an anchor to prevent the cleat receptacle from being pulled out of the spike plate. Located within the annular plate 24 and around the periphery are a plurality of slots 30. As shown in FIG. 4, the slots 30 in the annular plate 24 extend through the plate to provide an opening to permit the flow of the spike plate material through the annular plate 24 during formation of the spike plate 12. Upon hardening of the molded plastic material, the slots 30 assist in firmly securing the cleat receptacle within the molded spike plate. As preferred and illustrated, three slots are located on the annular plate with one slot located between two adjacent ribs 28. However, variations in the size, shape and number of slots 30 is contemplated and considered within the scope of the present invention. At its periphery, the annular plate 24 has smooth, rounded edges to prevent the cutting of the molded spike plate material during use of the athletic shoe.

Formed integral with the annular plate 24 is the threaded cylinder 26 and the plurality of ribs 28. The threaded cylinder 26 is open at end 32 and is closed at end 34. The threaded cylinder 26 has a smooth exterior to prevent cutting of the spike plate during use of the athletic shoe. The open end 32 of the cylinder 26 is internally threaded and sized to receive the detachable threaded cleats 22. As embedded within the spike plate, the open end 32 is flush with the raised traction surfaces 19 to receive the threaded cleats 22. Located near the closed end 34 is the annular plate 24. The annular plate 24 is positioned a sufficient distance from the closed end to permit the flow of spike plate material around the annular plate 24 and through the slots 30. The closed end 34 defines a smooth circular flat surface. The location of the annular plate 24 near the closed end 34 of the threaded cylinder along with the flat surface of the closed end 34 dissipate the pin pressure, placed on the foot, within the spike plate.

The plurality of ribs 28 are formed integral with the annular plate 24 and the threaded cylinder 26. The ribs 28 extend from the periphery of the annular plate 24 to the outer wall of the cylinder 26. Each rib 28 defines a rib opening 36. The rib opening 36 is thus surrounded by the annular plate 24, the cylinder 26 and the rib 28. Advantageously, during molding of the spike plate, through conventional injection molding, plastic spike plate material can flow through the rib opening 36. Upon hardening of the spike plate material within the opening 36, the cleat receptacle 20 is more firmly secured into the spike plate. In addition, the ribs 28 increase the structural integrity of the receptacle 20 by providing reinforcement of the integral annular plate 24 to the threaded cylinder 26. That is, in operation, the ribs 28 prevent bending or flexing of the annular plate 24 in relation to the threaded cylinder 26. The ribs 28 are also smooth and rounded to prevent cutting of the spike plate. As preferred, three ribs are spaced equidistant around the cylinder 26. However, it is contemplated that the number and size of ribs may vary depending on the desired application.

Figure 6:
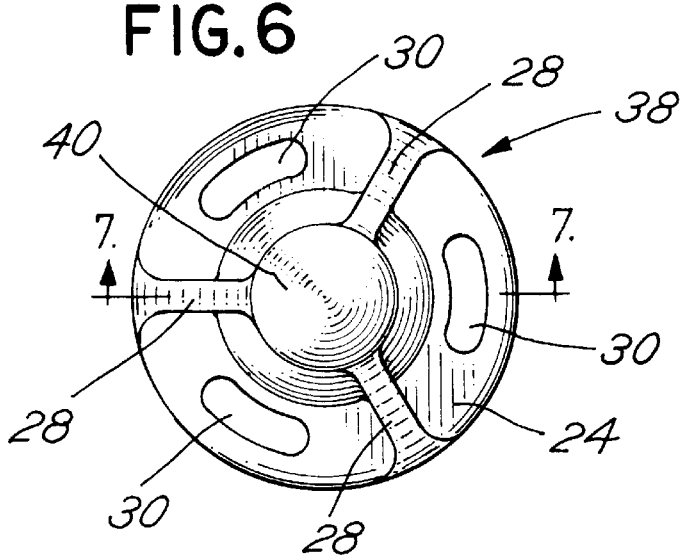
FIG. 6 is a top plan view of an alternative embodiment of the cleat receptacle shown in FIG. 2.
Figure 7:
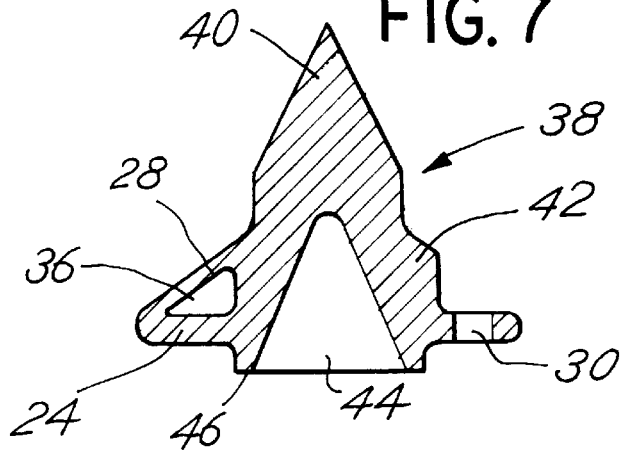
FIG. 7 is a cross-sectional elevation view of an alternative embodiment of the cleat receptacle shown in FIG. 2.
Figure 8:
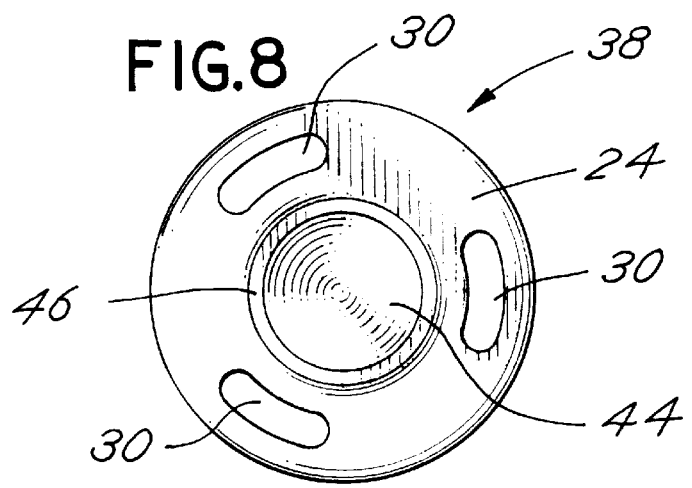
FIG. 8 is a bottom plan view of an alternative embodiment of the cleat receptacle shown in FIG. 2.

Referring to FIGS. 6–8, an alternative embodiment is disclosed that illustrates an integral cleat and cleat receptacle. Cleat 38 comprises a spike 40, a cylindrical body 42, the annular plate 24 and the plurality of ribs 28. As conventional, the spike 40 is conical shaped with a sharp tip. The cylindrical body 42 defines an end surface 46 and a cone shaped opening 44 that gradually tapers from the end 46 into the cylindrical body 42. As preferred, the annular plate 24 includes slots 30 that allow the flow of plastic spike plate material through the annular plate and, upon hardening, provide greater cleat holding strength. In addition, three ribs 28 are spaced around the cylindrical body 42. The ribs 28 define rib openings 36 that also allow plastic spike plate material to flow through and harden within the rib opening. The annular plate 24, the ribs 28 and the cylindrical body 42 are preferably smooth to prevent cutting of the spike plate.

The preferred embodiments of the invention are now described as to enable a person of ordinary skill in the art to make and use the same. Variations of the preferred embodiment are possible without being outside the scope of the present invention. Therefore, to particularly point out and distinctly claim the subject matter regarded as the invention, the following claims conclude the specification.

What is claimed is:

1. A cleat receptacle for an athletic shoe outsole comprising:
   a cylinder,
   a plate formed integral with said cylinder, said plate extending outward from said cylinder, and
   at least one rib extending from said plate to said cylinder, said rib defining an opening between said rib, said plate, and said cylinder.

2. The cleat receptacle of claim 1 wherein said plate is annular and defines a periphery.

3. The cleat receptacle of claim 2 wherein said annular plate defines a plurality of slots.

4. The cleat receptacle of claim 1 wherein said at least one rib is three ribs spaced around said cylinder.

5. The cleat receptacle of claim 1 wherein said cylinder is threaded and has an open end and a closed end, said open end receives an engages a detachable threaded cleat element.

6. The cleat receptacle of claim 1 wherein said cylinder includes an integrally formed spike tip.

7. The cleat receptacle of claim 6 wherein said at least one rib extends from the periphery of said annular plate to said cylinder and forms an opening between said at least one rib, said annular plate, and said cylinder.

8. The cleat receptacle of claim 6 wherein said at least one rib is three ribs spaced around said cylinder.

9. The cleat receptacle of claim 7 wherein said at least one rib is three ribs spaced around said cylinder.

10. A cleat plate for an athletic shoe outsole, comprising:
    a base plate with a plurality of raised traction surfaces formed integrally with said base plate from a single material, a plurality of cleat receptacles each comprising a cylinder, an annular plate, and a plurality of ribs, said annular plate being formed integral with said cylinder and extending outward from said cylinder to define a periphery, each of said ribs extending from said annular plate to said cylinder to define an opening, and said cleat receptacles being connected to said base plate by said material of said raised traction surface, said material being received about said cylinder, said annular plate and said ribs, and extending through said openings defined by said ribs.

11. The cleat plate of claim 10 wherein said cylinder is threaded and has an open end and a closed end, said open end receives and engages a detachable threaded cleat element.

12. The cleat plate of claim 10 wherein said plurality of ribs are three ribs which extend from the periphery of said annular plate to said cylinder.

13. The cleat plate of claim 10 wherein said annular plate defines a plurality of slots located near said periphery of said annular plate, and said material of said raised traction surface extending through said slots.

14. The cleat plate of claim 10 wherein said cylinder includes an integrally formed spike tip.

15. The cleat plate of claim 14 wherein said plurality of ribs extend from said periphery of said annular plate to said cylinder and form an opening between said rib, said annular plate and said cylinder.

16. The cleat plate of claim 14 wherein said plurality of ribs are three ribs which extend from the periphery of said annular plate to said cylinder.

17. The cleat plate of claim 15 wherein said plurality of ribs are three ribs which extend from the periphery of said annular plate to said cylinder.

18. An athletic shoe comprising:

a shoe upper, a cleat plate secured to said upper, and a plurality of cleat receptacles positioned on said cleat plate, said plurality of cleat receptacles further comprising a cylinder, an annular plate formed integral with said cylinder, and at least one rib defining an opening formed by said rib, said annular plate, and said cylinder.

19. The athletic shoe of claim 18 wherein said annular plate extends outward from said cylinder, defines a periphery, and further comprises a plurality of slots located near said periphery of said annular plate.

20. The athletic shoe of claim 19 wherein said cleat plate is made of a single cleat material, said cleat material being received about said cylinder, said annular plate and said ribs, and extending through said opening and said plurality of slots.

21. The athletic shoe of claim 20 wherein said at least one rib extends from said periphery of said annular plate to said cylinder.

22. The athletic shoe of claim 18 wherein said cylinder is threaded and has an open end and a closed end, said open end receives and engages a detachable threaded cleat element.

23. The athletic shoe of claim 18 wherein said at least one rib is three ribs positioned around said cylinder.

24. The athletic shoe of claim 22 wherein said annular plate is located near said closed end of said threaded cylinder.

25. The athletic shoe of claim 22 wherein said open end of said threaded cylinder faces outward from said cleat plate to receive said detachable threaded cleat element.

26. The athletic shoe of claim 18 wherein said cylinder includes an integrally formed spike tip.

27. The athletic shoe of claim 18 wherein said annular plate defines a periphery, said at least one rib extends from said periphery of said annular plate to said cylinder.

28. The athletic shoe of claim 18 wherein said at least one rib is three ribs which extend from said annular plate to said cylinder.

29. The athletic shoe of claim 27 wherein said at least one rib is three ribs which extend from said periphery of said annular plate to said cylinder.

* * * * *